UNITED STATES PATENT OFFICE.

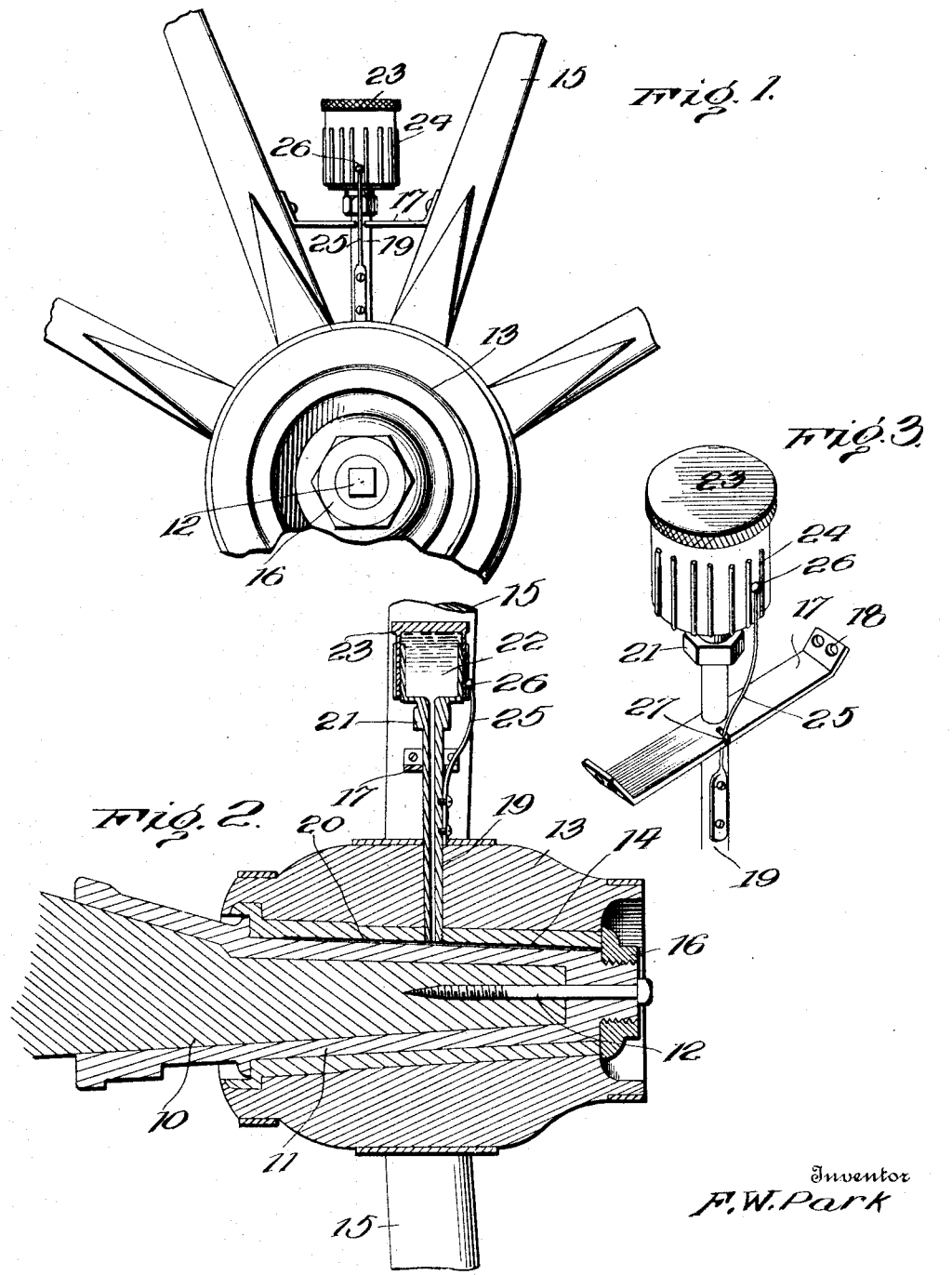

FREDERICK W. PARK, OF OXFORD, MICHIGAN.

LUBRICATOR FOR VEHICLE-WHEELS.

1,192,104.  Specification of Letters Patent.  Patented July 25, 1916.

Application filed July 1, 1915. Serial No. 37,529.

*To all whom it may concern:*

Be it known that I, FREDERICK W. PARK, a citizen of the United States, residing at Oxford, in the county of Oakland and State of Michigan, have invented certain new and useful Improvements in Lubricators for Vehicle-Wheels, of which the following is a specification.

This invention contemplates an improved lubricator for vehicle wheels and has as its primary object to provide a device of this character manually operable to feed the lubricant to the vehicle wheel axle.

The invention has as a further object to provide a construction which may be readily applied to any conventional type of vehicle wheel and wherein, if desired, the lubricator may be easily removed to permit of repair or replacement. And a still further object of the invention is to provide a lubricator employing a grease cup having a screw threaded cap adapted to coact with the body of the cup for forcing the lubricant to the vehicle axle and wherein yieldable means will be provided for holding the cup stationary.

Other and incidental objects will appear as the description proceeds and in the drawings wherein I have illustrated the preferred embodiment of the invention and wherein similar reference characters designate corresponding parts throughout the several views, Figure 1 is a fragmentary elevation showing my improved lubricator applied to a conventional type of vehicle wheel. Fig. 2 is a vertical sectional view more particularly showing the construction and mounting of the lubricator, Fig. 3 is a fragmentary perspective view showing the lubricator detached.

For convenience, I have in the drawings, shown my improved lubricator in connection with a conventional type of vehicle wheel and axle wherein the axle is indicated at 10. Fitting over the axle is a thimble 11 which is held in position by a lag bolt 12. The hub of the wheel is indicated at 13 and is provided with a skein 14 removably receiving the thimble 11 in the usual manner. Extending from the hub are a plurality of radial spokes 15 and connecting the wheel with the axle is a nut 16.

Coming now more particularly to the subject of the present invention, I employ a bracket plate 17 which is preferably formed from a strip of suitable resilient sheet metal and at its extremities is bent laterally to provide attaching lugs 18. The bracket 17 is arranged to extend transversely between contiguous spokes 15 of the wheel adjacent the inner extremities thereof as shown in Fig. 1 of the drawings with the lugs 18 seating flatly against the confronting faces of the said spokes and secured thereto by screws or other suitable fastening devices.

The bracket 17, at a point midway its ends is provided with a suitable opening freely receiving the hollow stem 19 of the lubricator. The stem 19 is arranged radially of the hub and at its inner extremity is screw threaded into the skein 14 upon one side thereof with the stem opening through the skein. Formed in the inner face of the skein 14 and communicating with the stem 19 is a longitudinally extending groove 20 providing a lubricant receiving chamber. The groove 20 may, of course, be of any desired length to thus be adapted to distribute a lubricant longitudinally of the thimble 11 either for a portion of its length or throughout the entire length thereof.

The stem 19, adjacent the outer extremity thereof, is formed with a wrench receiving enlargement 21 and is provided terminally with a suitable externally screw threaded lubricant receiving cup 22 which communicates with the stem. Removably fitted upon the cup and adjustable longitudinally thereon is an internally screw threaded cap 23 engaging the threads of the cup and which upon the outer face thereof is provided with a series of circumferentially spaced and longitudinally extending ribs 24.

Terminally connected to the stem 19 upon one side thereof is a yieldable detent or holding element 25. The detent 25 is preferably formed from a length of suitable resilient wire and at its free extremity, is formed with a terminal spherical head 26 normally arranged to engage the cap 23. It will be noted that the head of the detent is adapted to engage between adjacent ribs of the series of ribs 24 for holding the cap 23 against turning movement upon the cup 22. If found necessary, the bracket 17 may be provided with a suitable notch 27 upon one side thereof adapted to freely receive the shank of the detent 25 in its movement to engage the cap. The bracket 17 will therefore not only serve as a guide for the detent 25 but will also provide a guard for the shank thereof acting to brace the shank when the cap 23 is rotated upon the cup to prevent the head 26 of the detent from moving with the cap so that the head of the detent will ride over the ribs 24 of the cap when the cap is adjusted upon the stem 19. Moreover, the bracket 17 will thus tend to prevent the detent 25 from becoming bent or broken off.

Attention is now directed to the fact, as more particularly shown in Fig. 2 of the drawings, that my improved lubricator is arranged upon the wheel entirely within the lines of the spokes 15 so that the possibility of accidental injury to the device, will be reduced to a minimum. The cup 22 may be filled with hard grease or other suitable lubricant and the cap 23 then operated to force the lubricant through the stem 19 to emerge into the lubricant receiving chamber 20 and consequently be distributed to the thimble 11. Thus, the wheel may be easily kept lubricated and attention is also called to the fact that the detent 25 will normally, at all times, engage the cap to prevent the retrograde movement thereof upon the cup, so that the cap will not, under ordinary circumstances, become accidentally lost. Furthermore, the detent 25 will prevent any possible rattling of the cap upon the cup.

It will therefore be seen that I provide a very simple and efficient construction for the purpose set forth which may be readily applied to any conventional type of vehicle wheel and which, in use, will furnish a very convenient and quick means of lubricating the vehicle wheel.

Having thus described my invention, what I claim and desire to secure by Letters Patent is:—

1. A lubricator including a stem having a lubricant receiving cup communicating therewith, a bracket for supporting the stem and adapted for attachment to a vehicle wheel with the stem communicating with the wheel skein, a cap adjustable longitudinally of the cup, and a detent carried by the stem and engaging the cap for holding the cap at adjustment with the bracket freely engaging the detent to provide a guide therefor.

2. A lubricator including a stem having a lubricant receiving cup communicating therewith, a bracket for supporting the stem and adapted for attachment to a vehicle wheel with the stem communicating with the wheel skein, a cap rotatably adjustable upon the cup, and a detent carried by the stem and having its free end engaging the cap for holding the cap at adjustment with the free extremity of the detent engaged by the bracket to hold the free end of said detent against turning movement with the cap.

3. A lubricator including a stem having a lubricant receiving cup communicating therewith, a cap adjustable upon the cup, a bracket for supporting the stem and adapted for attachment to a vehicle wheel with the stem communicating with the wheel skein, and a detent carried by the stem with its free end guided by the bracket to engage the cap for holding the cap at adjustment.

4. A lubricator including a stem having a lubricant receiving cup communicating therewith, a cap rotatably adjustable upon the cup, a bracket for supporting the stem and adapted for attachment to a vehicle wheel with the stem communicating with the wheel skein, there being a notch formed in the bracket, and a detent fixed at one end to the stem with its free extremity extending through said notch to be guided by the bracket to engage the cap for holding the cap at adjustment.

In testimony whereof I affix my signature in presence of two witnesses.

FREDERICK W. PARK. [L. S.]

Copies of this patent may be obtained for five cents each, by addressing the "Commissioner of Patents, Washington, D. C."